US006796122B2

(12) United States Patent
Scranton

(10) Patent No.: US 6,796,122 B2
(45) Date of Patent: Sep. 28, 2004

(54) FLUIDIZED BED COMBUSTION WITH HEAT ENGINE

(75) Inventor: James M. Scranton, Athol, ID (US)

(73) Assignee: James N. Scranton, Athol, ID (US)

( * ) Notice: Subject to any disclaimer, the term of this patent is extended or adjusted under 35 U.S.C. 154(b) by 0 days.

(21) Appl. No.: 10/376,810

(22) Filed: Feb. 28, 2003

(65) Prior Publication Data

US 2003/0163992 A1 Sep. 4, 2003

Related U.S. Application Data

(60) Provisional application No. 60/360,594, filed on Feb. 28, 2002.

(51) Int. Cl.$^7$ ................................................ F01B 29/10
(52) U.S. Cl. .......................................... 60/517; 60/670
(58) Field of Search ........................... 60/517, 670, 682

(56) References Cited

U.S. PATENT DOCUMENTS

| | | | | |
|---|---|---|---|---|
| 4,079,585 A | * | 3/1978 | Helleur | 60/781 |
| 4,126,995 A | * | 11/1978 | Asselman et al. | 60/524 |
| 4,412,421 A | | 11/1983 | Smith, Jr. | |
| 4,924,123 A | * | 5/1990 | Hamajima et al. | 310/15 |
| 5,878,570 A | * | 3/1999 | Reithofer | 60/520 |
| 6,039,774 A | * | 3/2000 | McMullen et al. | 48/102 A |
| 6,276,306 B1 | * | 8/2001 | Murphy et al. | 122/7 R |

* cited by examiner

Primary Examiner—Hoang Nguyen
(74) Attorney, Agent, or Firm—Ormiston & McKinney, PLLC

(57) ABSTRACT

Embodiments of the invention include a sleeved heat engine that can be used in a fluidized bed combustion system and a fluidized bed combustion system with heat engines. In one embodiment, a heat engine includes an enclosed cylinder, a fixed charge of gas in the cylinder, a piston in the cylinder, and a sleeve spaced apart from and surrounding part of the cylinder. The sleeve defines a passage along part of the cylinder to carry, for example, combustion air introduced into a fluidized bed combustion chamber. In another embodiment, a system includes a combustion chamber, a bed of sand in the combustion chamber, multiple air passages penetrating the combustion chamber such that air entering the combustion chamber through the passages passes through the sand, and multiple heat engines disposed along the combustion chamber such that at least a part of each heat engine is exposed to sand in the bed of sand.

13 Claims, 6 Drawing Sheets

FLUIDIZED BED COMBUSTION WITH HEAT ENGINE

CROSS REFERENCE TO RELATED APPLICATION

This application claims subject matter disclosed in now abandoned provisional patent application serial No. 60/360,594 filed Feb. 28, 2002, entitled Fluidized Bed Combustion With Heat Engine.

BACKGROUND

Fluidized bed combustion has become one of the most popular methods for burning solid fuels. Fluidized bed combustion uses a bed of sand as a grid, air distribution mechanism, fuel particle scrubber and thermal energy flywheel to burn solid fuel more cleanly and efficiently than other combustion systems. Combustion air is forced up through a bed of sand at high enough velocity to suspend the grains of sand. The volume of the sand expands and the sand appears to boil, bubble and churn. Hence, the sand is said to be "fluidized." The sand is initially heated by an external source, usually a gas burner, until it is hot enough to ignite the fuel. For most solid fuels used in conventional fluidized bed combustion, the sand is pre-heated to about 800° F. Once the sand is pre-heated and fuel introduced into the combustion chamber ignites, the burner can be shut off. The heat released by the burning fuel continues to heat the sand until equilibrium is reached between the cooler combustion air entering the sand and the burning fuel, typically about 1,500° F. The incoming air forces the gaseous and solid reaction products of the burning fuel up through the combustion chamber as the fuel continues to burn, heating the gases to about 1,750° F. These hot gases are passed through a boiler to make steam to produce electricity. Steam tubes are often immersed in the bed sand to extract heat to produce more steam while helping control the temperature of the sand. Gases exhausted from the combustion chamber are sometimes used to pre-heat the combustion air so that the combustion process begins at a higher temperature, improving efficiency.

A heat engine, such as a Stirling engine, uses heat applied externally to do work. In a Stirling engine, heat is applied externally to one end of a cylinder. The heat expands a working gas in the engine to push a piston and do work. A displacer then pushes the working gas to the cool end of the cylinder where it contracts to pull the piston and do more work. Heat engines are sometimes referred to as external combustion engines because heat is applied to the engine from an external source.

DETAILED DESCRIPTION

The present invention is directed to a new power generation system that incorporates a heat engine into the fluidizing air distribution nozzles of a fluidized bed combustion chamber. The heat engines use the temperature difference between the hot fluidized bed sand and the cooler combustion air to generate electricity or do other work. The new system improves efficiency by returning to the combustion air heat that would otherwise be lost to the system.

Figure 1:
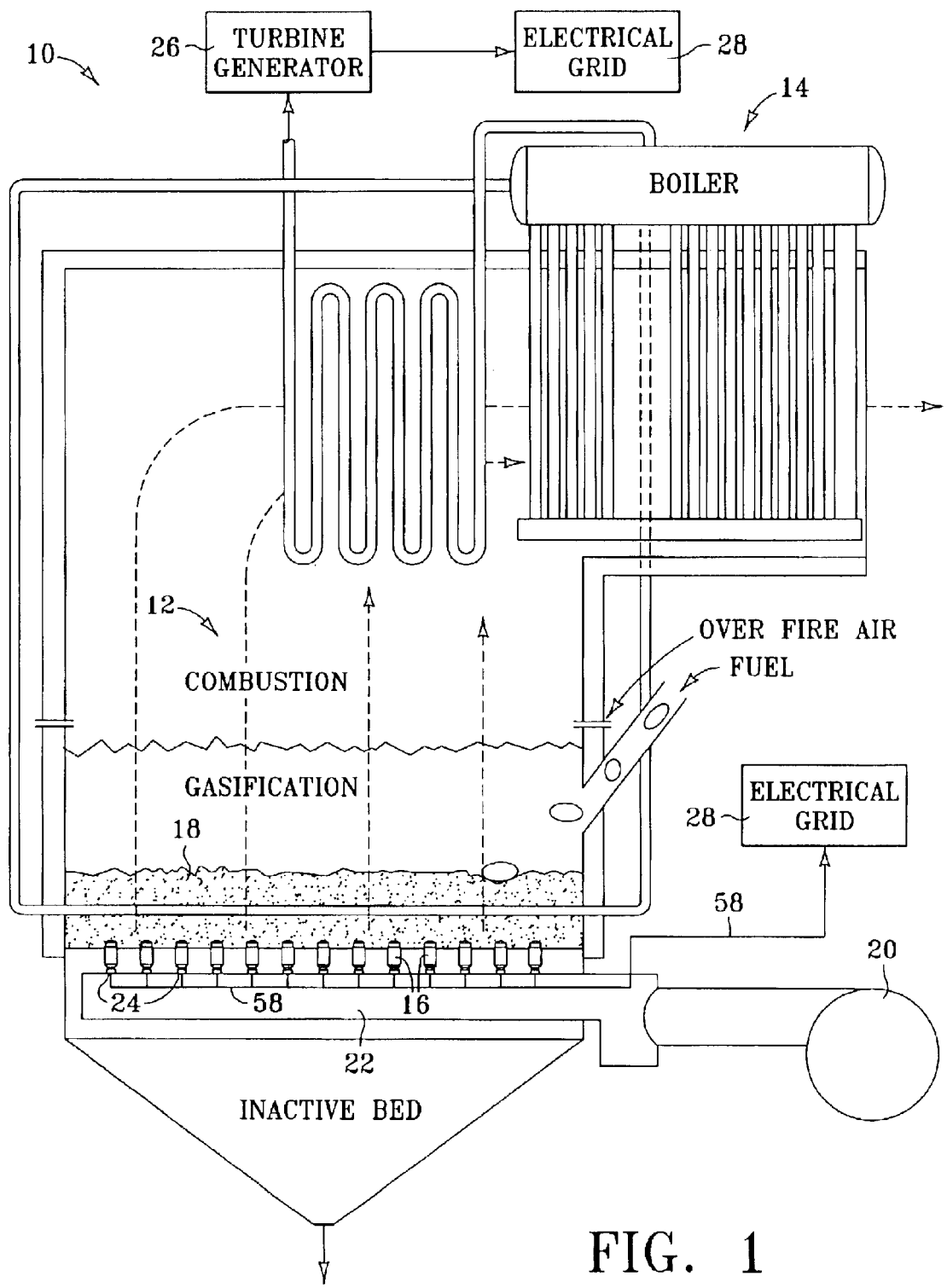
FIG. 1 illustrates a power generating system according to one embodiment of the present invention in which power is generated with an array of heat engines located at the bottom of the bed in a fluidized bed combustion chamber.

Referring to FIG. 1, an electrical generating system 10 includes a fluidized bed combustion chamber 12, boiler 14 and heat engines 16. A bed of sand 18 is located at the bottom of combustion chamber 12. At the urging of a fan 20, combustion air is introduced into chamber 12 through a plenum 22 and an array of air passages 24 that project up from plenum 22 across the bottom of bed 18. As described in detail below with reference to FIGS. 2A–2D, each heat engine 16 is integral to an air passage 24 such that some or all of the combustion air introduced into sand 18 flows past the heat engines.

Steam made in boiler 14 from the heat of the burning fuel is delivered to a turbine generator 26 where electricity is produced and sent on to a power grid 28 or other facility. Combustion chamber 12, boiler 14, bed/sand 18, fan 20, plenum 22 and turbine generator 26 represent components of a conventional fluidized bed combustion electrical generating system. While it is expected that heat engines 16 could be retrofit installed into existing fluidized bed combustion systems, these components might be modified somewhat from their conventional design when used in the heat engine system of the present invention as necessary or desirable to optimize system performance.

FIGS. 2A–2D are section views of a cylindrical free piston Stirling engine adapted for use with the present invention. FIG. 3 is an elevation view showing the outside of the engine. The section views of FIGS. 2A–2D show the different positions of the engine through one operating cycle. Each engine 16 includes a linear generator 30 connected to a power piston 32. Linear generator 30 includes magnets 34 carried by a connecting rod 36 through a surrounding coil of electrically conductive windings 38. Piston 32 is operatively coupled to a displacer 40 through a working gas 42. An air passage 44 around the outside of engine 16 carries fluidizing/combustion air from plenum 22 to bed 18. Passage 44 is formed as an opening between an outer sleeve 45 of engine 16 and the internal housing 47. Passage 44 extends from the bottom of engine 16 at plenum 22 up to near the top of engine 16 at discharge ports 49 to form each air passage 24 noted in FIG. 1. A cooling fin 46 may be used to improve heat transfer between engine 16 and the combustion air moving through sleeve 44. While it is expected that in most applications substantially all of the combustion air will be introduced into bed 18 through engine passages 44, the volume of combustion air introduced into bed 18 through passages 44 may vary depending on the particular system application and performance requirements.

Displacer 40 and power piston 32 reciprocate in a chamber 48 filled with a fixed charge of working gas 42, typically helium. As displacer 40 reciprocates, it shuttles working gas 42 through a regenerator 50 between hot region 52 and cool region 54 of gas chamber 48. The pressure wave thus created by varying the average gas temperature is applied to piston 32. Displacer 50 and power piston 32 are phased so that more work is put into piston 32 in the expansion stroke when most of gas 42 is in hot region 52 than the work piston 32 returns to gas 42 a half cycle later to compress the mostly cool gas. The net surplus of expansion work over compression work is extracted as useful work by piston 32. External heat is supplied at the cycle maximum temperature and rejected at the cycle minimum temperature. Regenerator 50, which is usually constructed as a metal mesh, absorbs heat from gas 42 as the gas passes through it from hot region 52 to cool region 54 and returns the stored heat to gas 42 on its return from cool region 54 to hot region 52.

Figure 2A:
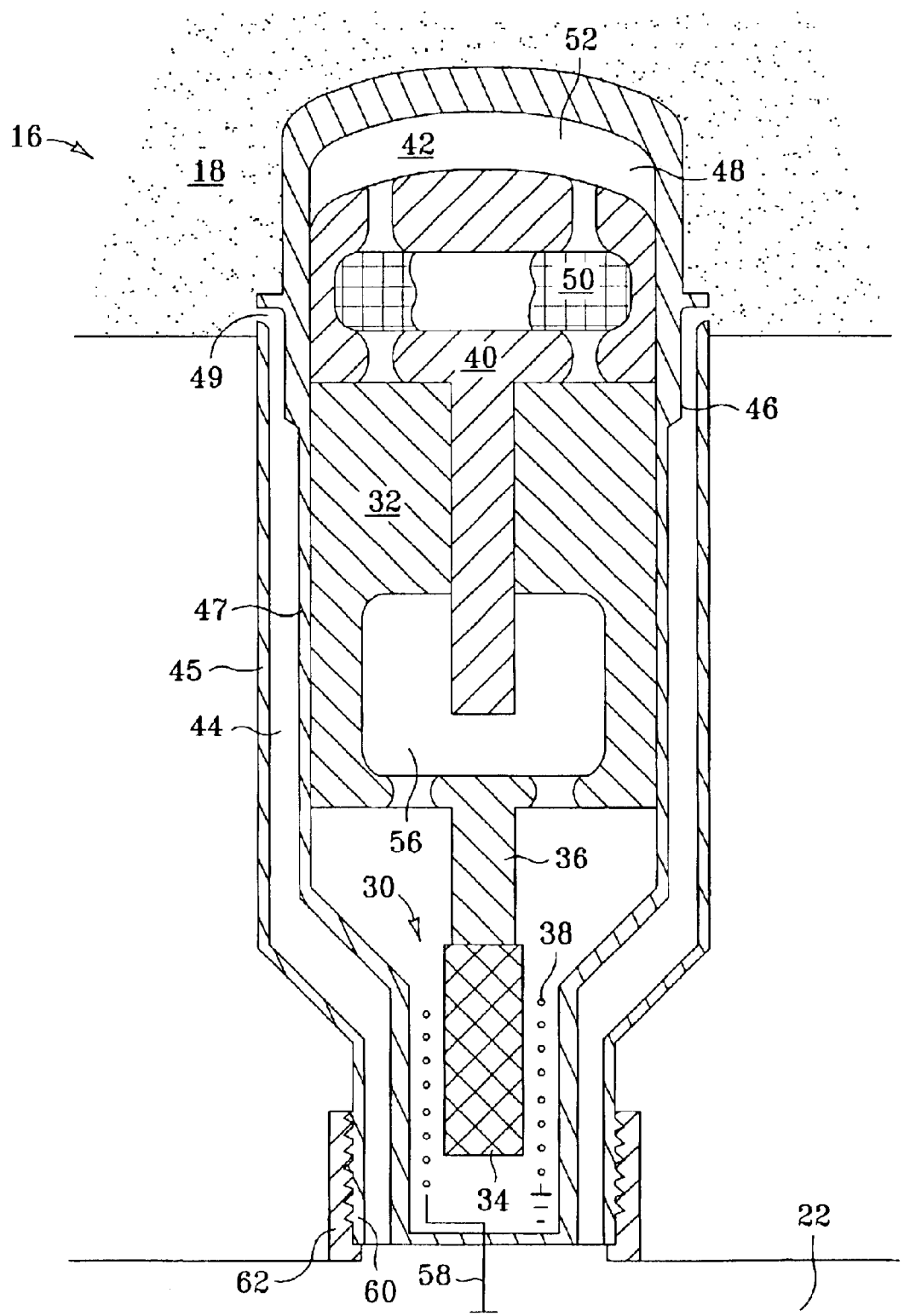
FIGS. 2A–2D show the motion of a free piston Stirling engine used in the system of FIG. 1.
Figure 2B:
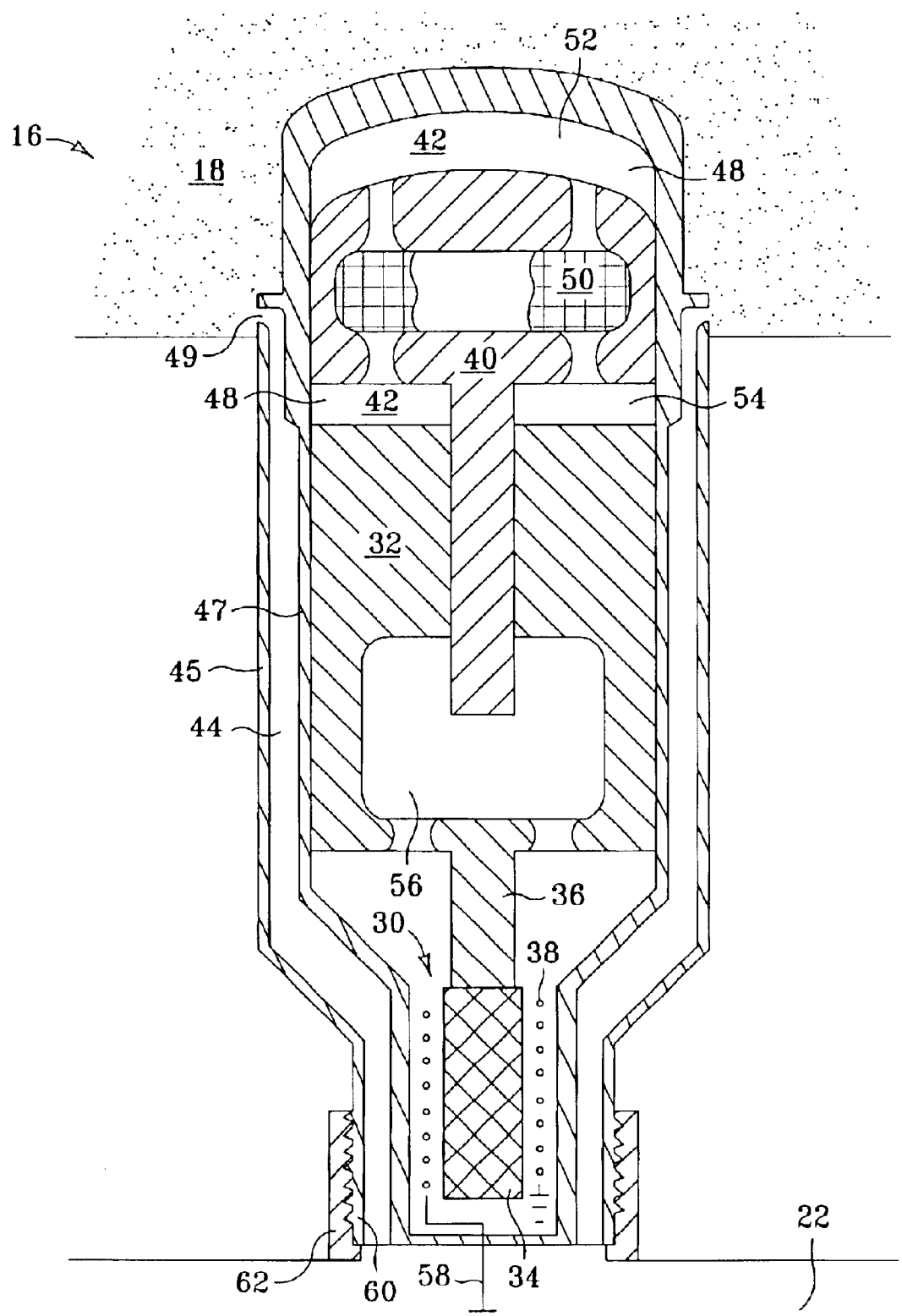
Figure 2C:
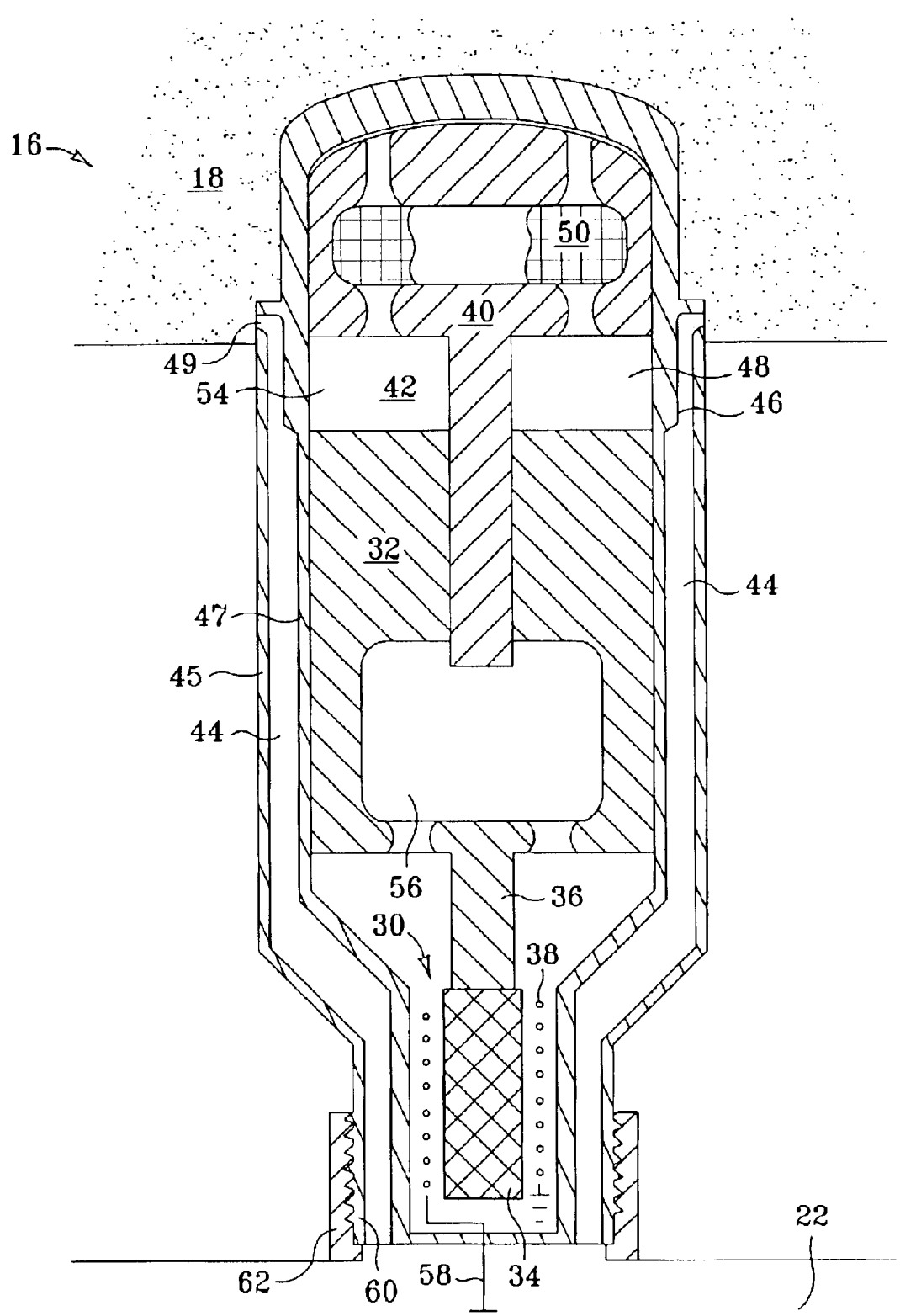
Figure 2D:
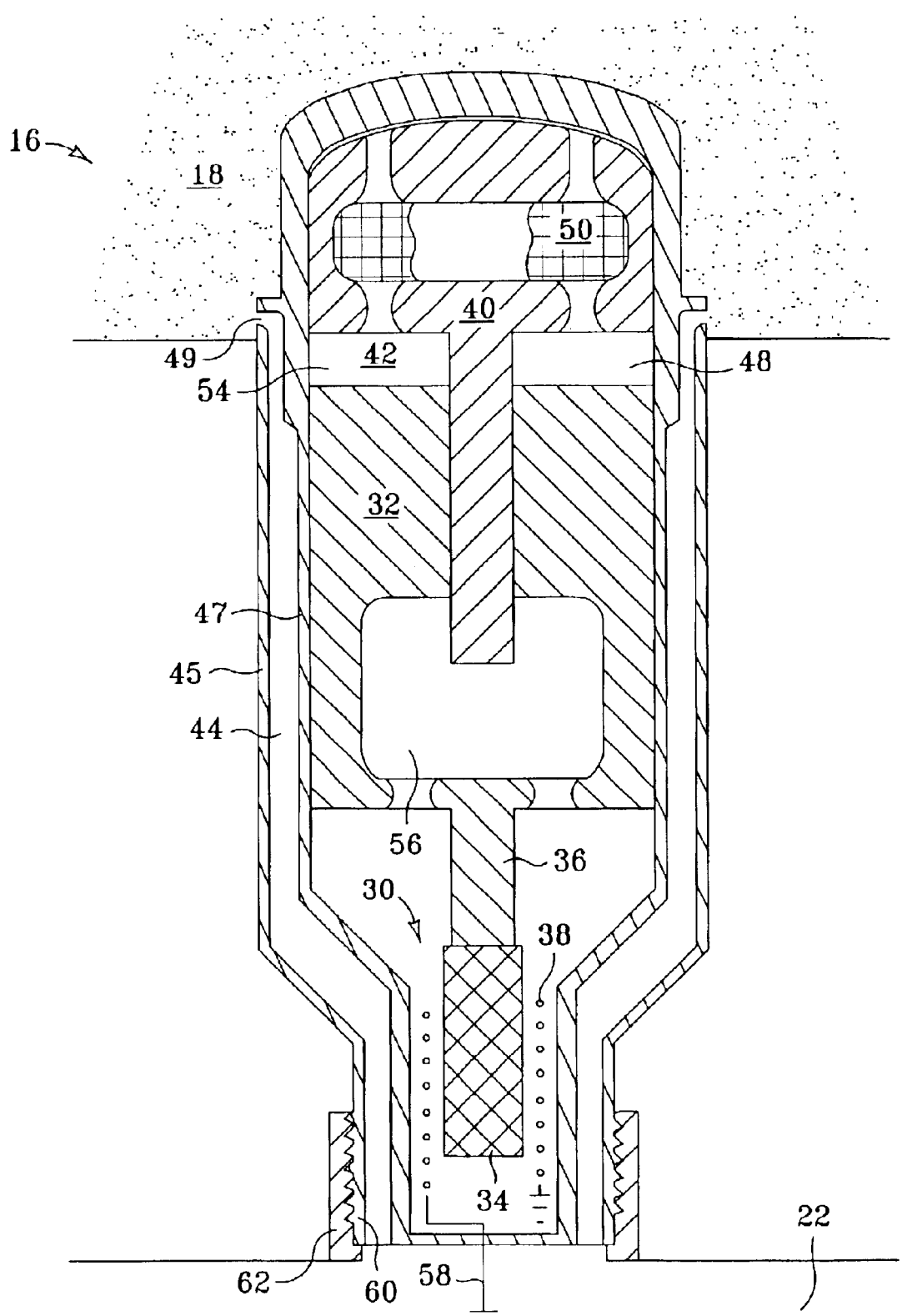
Figure 3:
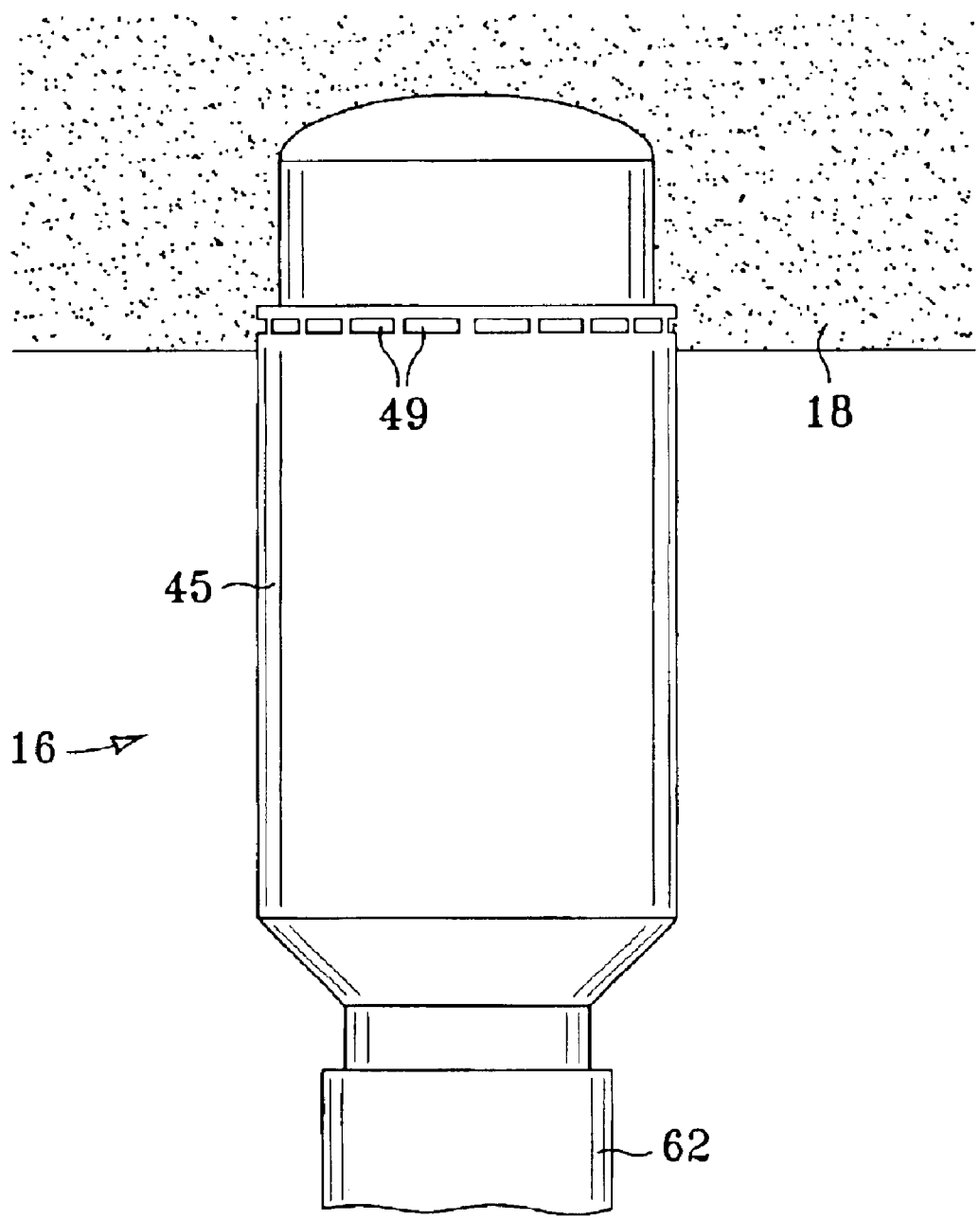
FIG. 3 is an elevation view showing the outside of the engine of FIGS. 2A–2D.

In FIG. 2A, most of working gas 42 is in the hot upper region 52 of gas chamber 48 where it is heated by sand 18, expands through regenerator 50 to the cool lower region 54 and pushes down on piston 32. Referring now to FIGS. 2B and 2C, as piston 32 moves down at the urging of expanding gas 42, bounce space 56 contracts to a positive pressure that pushes up on displacer 40. As displacer 40 moves up, it forces more of working gas 42 down through regenerator 50 to cool region 54. The cool working gas 42 in region 54 contracts to pull up on piston 32 as best seen by comparing FIGS. 2C and 2D. As piston 32 moves up, bounce space 56 expands to a negative pressure that pulls down on displacer 40. As displacer 40 moves down, it forces working gas 42 up through regenerator 50 to hot region 52, as shown in FIG. 2A, to complete the cycle.

Magnets 34 move back and forth at the urging of reciprocating piston 30 to induce an electric current in coil 38. The electricity produced by linear generator 30 in each engine 16 is sent on to power grid 28 or another facility through transmission line 58.

Heat from engine 16 is rejected to the combustion/fluidizing air flowing around the engine through sleeve 44. Placing cooling fins 46 around lower region 54 of gas chamber 48 improves heat transfer to the combustion air.

In one preferred version of the invention that can be retrofit installed into existing fluidized bed combustion systems, engine 16 is fitted with an externally threaded base 60. Internally threaded couplings 62 are welded or otherwise affixed to fluidizing/combustion air passage tubes 24. Each engine 16 can then be screwed into a tube 24 and the combustion air redirected along engines 16. Electrical transmission wire 58 can be run conveniently out the bottom of engine 16 through combustion air passage tubes 24.

The present invention has been shown and described with reference to the foregoing exemplary embodiments. Other embodiments are possible. It is to be understood, therefore, that these and other forms, details, embodiments and variations may be made without departing from the spirit and scope of the invention which is defined in the following claims.

What is claimed is:

1. A system, comprising:
   a combustion chamber;
   a bed of non-combustible particles in the combustion chamber;
   multiple air passages penetrating the combustion chamber such that air entering the combustion chamber through the passages passes through the bed of non-combustible particles; and
   multiple heat engines disposed along the combustion chamber such that at least a part of each heat engine is exposed to non-combustible particles in the bed of non-combustible particles.

2. The system of claim 1, wherein at least part of each heat engine is in fluid communication with an air passage such that air passing through the passage passes along at least a part of the heat engine.

3. The system of claim 2, wherein each heat engine includes a housing and a sleeve spaced apart from and surrounding the housing, each air passage defined by the space between the engine housing and the engine sleeve.

4. The system of claim 2, wherein at least part of each heat engine is positioned in an air passage such that air passing through the passage passes around at least a part of the heat engine.

5. The system of claim 1, further comprising a source of pressurized air connected to the combustion chamber through the air passages.

6. The system of claim 5, wherein the source of pressurized air comprises an air plenum.

7. The system of claim 5, wherein the source of pressurized air comprises an air pump and a plenum between the air pump and the air passages.

8. The system of claim 1, wherein the bed of non-combustible particles comprises a bed of sand.

9. A system, comprising:
   a combustion chamber having a bottom;
   a bed of non-combustible particles in the bottom of the chamber; and
   multiple heat engines disposed along the bottom of the combustion chamber, a top part of each heat engine surrounded by non-combustible particles in the bed of non-combustible particles.

10. A system, comprising:
    a combustion chamber having a bottom;
    a bed of non-combustible particles in the bottom of the chamber;
    multiple air passages penetrating the bottom of the combustion chamber; and
    multiple heat engines disposed along the bottom of the combustion chamber, an upper part of each heat engine surrounded by non-combustible particles in the bed of non-combustible particles and a lower part of each heat engine in fluid communication with an air passage.

11. The system of claim 10, wherein the lower part of each heat engine is disposed in an air passage.

12. An electric power generator, comprising:
    a combustion chamber;
    a bed of non-combustible particles in the combustion chamber;
    multiple heat engines disposed along the combustion chamber such that at least a part of each heat engine is exposed to non-combustible particles in the bed of non-combustible particles; and
    a linear electric generator integral to each heat engine.

13. The generator of claim 12, further comprising:
    a boiler in fluid communication with the combustion chamber such that hot gases generated in the combustion chamber flow past the boiler; and
    a turbine electric generator operatively coupled to the boiler.

* * * * *